(12) United States Patent
Horst

(10) Patent No.: US 12,519,899 B2
(45) Date of Patent: *Jan. 6, 2026

(54) METHOD FOR OPERATING A SCANNING SYSTEM

(71) Applicant: Genius Bytes Software Solutions GmbH, Bochum (DE)

(72) Inventor: Matthias Horst, Bochum (DE)

(73) Assignee: Genius Bytes Software Solutions GmbH, Bochum (DE)

( * ) Notice: Subject to any disclaimer, the term of this patent is extended or adjusted under 35 U.S.C. 154(b) by 576 days.

This patent is subject to a terminal disclaimer.

(21) Appl. No.: 17/840,794

(22) Filed: Jun. 15, 2022

(65) Prior Publication Data
US 2022/0400186 A1 Dec. 15, 2022

(30) Foreign Application Priority Data
Jun. 15, 2021 (EP) .................................... 21179494

(51) Int. Cl.
*H04N 1/44* (2006.01)
*H04L 9/30* (2006.01)
*H04L 9/40* (2022.01)

(52) U.S. Cl.
CPC ....... *H04N 1/4486* (2013.01); *H04L 63/0442* (2013.01); *H04L 63/061* (2013.01); *H04N 2201/3269* (2013.01)

(58) Field of Classification Search
CPC ........................... H04L 63/0442; H04L 63/061
See application file for complete search history.

(56) References Cited

U.S. PATENT DOCUMENTS

| | | | |
|---|---|---|---|
| 9,377,979 B1* | 6/2016 | Hansen | G06F 3/1203 |
| 2006/0136726 A1* | 6/2006 | Ragnet | G06F 21/608 |
| | | | 713/171 |
| 2008/0019519 A1 | 1/2008 | Su et al. | |
| 2017/0250974 A1* | 8/2017 | Antonyraj | H04W 12/50 |
| 2021/0258171 A1* | 8/2021 | Lee | G06F 21/36 |
| 2021/0377047 A1* | 12/2021 | Haque | H04L 9/0825 |
| 2022/0078181 A1* | 3/2022 | Brito | G06F 3/1222 |

FOREIGN PATENT DOCUMENTS

| | | | | |
|---|---|---|---|---|
| DE | 0929023 B1 * | 12/1998 | | G06F 1/00 |
| EP | 1542396 B1 | 5/2007 | | |
| WO | WO-2018115667 A1 * | 6/2018 | | G06F 21/335 |
| WO | WO-2020086088 A1 * | 4/2020 | | G06F 21/608 |
| WO | WO-2021054967 A1 * | 3/2021 | | G06F 21/608 |

* cited by examiner

*Primary Examiner* — Phy Anh T Vu
(74) *Attorney, Agent, or Firm* — Reinhart Boerner Van Deuren P.C.

(57) ABSTRACT

The application relates to a method for operating a scanning system with a scan server arrangement and a scanning device that can be connected to the scan server arrangement. The scanning system is configured to obtain a scan job encrypted with a public scan job key from a scanning device and to receive a private scan job key encrypted with a public computer device key from a mobile user terminal. The received encrypted private scan job key is subsequently sent to the computer device for further processing.

15 Claims, 6 Drawing Sheets

METHOD FOR OPERATING A SCANNING SYSTEM

CROSS-REFERENCE TO RELATED PATENT APPLICATIONS

This patent application claims priority to European Patent Application No. 21179494.6, filed Jun. 15, 2021, the entire teachings and disclosures of which are incorporated herein by reference thereto.

FIELD OF THE INVENTION

The application relates to a method for (securely) operating a scanning system. Furthermore, the application relates to a scan server arrangement, a scanning device for a scanning system, a computer device for a scanning system, a scanning system and a scanning application.

BACKGROUND OF THE INVENTION

Methods for operating scanning systems and scanning systems with at least one scanning device are known from the prior art, which can be used by at least one computer device to receive and further process a document scanned by the scanning device, i.e. a scan job.

Thus, a scan job can be generated by the scanning device in a conventional manner. The generated scan job may be transmitted to the computer device via a wireless and/or wired communication network. Upon a receipt of the scan job, the computer device may process the scan job, for example display the scanned document or the like on a display or display unit of the computer device.

Typically, a scanning system comprises at least one scanning device, at least one scan server arrangement with at least one scan server component and a plurality of computer devices. Said elements are interconnectable via a wireless and/or wired communication network.

A fundamental problem of such scanning systems is that documents scanned by a scanning device are often sent to the computer device unencrypted, for example as part of an e-mail or the like. This makes it possible for unauthorised third parties to intercept this unencrypted communication and thus gain unauthorised access to scanned documents or scan jobs. Also, a (network) scanning device is usually used by a plurality of computer devices and/or users. In addition, a scanning device is located at a distance from the computer devices.

When a scan job is generated by a scanning device operated by a first authorised user, the generated scan job can be transmitted, for example with the interconnection of a scan server arrangement, to a computer device and email address, respectively, specified by the user. In the case of an email address, the user can access his email account on the computer device in a conventional manner and access the unencrypted scanned document.

In order to increase the security of such scanning systems and, in particular, to prevent unauthorised third parties from accessing documents scanned by a (network) scanning device, in the prior art user-related signature cards (also called smart cards) are used. In particular, a signature card with a secret key can be uniquely assigned to each user.

Such a prior art scanning system 100 is shown in FIG. 1. The scanning system 100 comprises a plurality of computer devices 102, 104, each of which comprises a card reader 110 or is connected to such a card reader 110.

Furthermore, the scanning system 100 comprises at least one (network) scanning device 108. The scanning device 108 has a scanning function in a conventional manner. As can be seen, the scanning device 108 is also connected to and equipped with a card reader 110.

In this system 100, in order to transmit a scan job to one of the computer devices 102, 104, a user 114 may first scan a document in a conventional manner. The user 114 may then insert respectively hold his or her signature card 118 into or against the card reader 110 of the scanning device 108. The signature card has a storage means 116, in which the private key and secret key, respectively, of the user 114 is stored.

Then, the scan job, containing the scanned document and the corresponding scan data, respectively, is encrypted with the secret key (also called private key) of the user 114. In particular, the key can be used by the card reader 110 or the scanning device 108 for encrypting.

The scan job encrypted with the key is then sent to the scan server arrangement 106 of the scanning system 100 via a wireless and/or wired communication network 122 and stored in a data memory 120 of the scan server arrangement 106.

In order to obtain the document in a secure manner at a computer device 102, 104, the encrypted scan job may be transmitted from the scan server arrangement to the computer device 102, 104. The user 114 holds his or her signature card in or against the card reader 110 of the computer device 102, 104. The encrypted scan job is then decrypted using the secret key of the user detected by the card reader 110 at the computer device 102, 104. The decrypted document is then displayed, for example, by a display of the computer device 102, 104 or can be further processed in another way.

Such a scanning system has the advantage that access to the encrypted document by an unauthorised third party who is not in possession of the secret key of the user can be made more difficult However, the described scanning system of the prior art has the disadvantage that additional hardware is required. In addition to the large number of card readers with which each device must be equipped, each user must have his or her own signature card.

In addition, the operation of such a scanning system involves a lot of effort, since, for example, the certificates of the signature cards have to be updated regularly. Revocation lists must be maintained to prevent revoked signature cards (which have been lost by a user, for example) from continuing to be usable.

Furthermore, the security is improved. However, the security level of the scanning system is comparatively low because the secret key used is only personal and user-related, respectively. If the key becomes known to an unauthorised third party, he or she can view the transmitted encrypted scan jobs without authorisation.

Therefore, the object of the present application is to provide a method for operating a scanning system, which enables, in a simple manner and at the same time in a secure manner, scanning jobs at a scanning device of the scanning system as well as a secure transmission of the scanning jobs to a computer device.

BRIEF SUMMARY OF THE INVENTION

The object is solved in accordance with a first aspect by a method of the present embodiment. The method for operating a scanning system comprising at least one scan server arrangement and at least one scanning device communicatively connectable to the scan server arrangement comprises:

obtaining, by the scan server arrangement, a scan job encrypted with a public scan job key of a scan job key pair from a scanning device communicatively connectable to the scan server arrangement, obtaining, by the scan server arrangement, a private scan job key of the scan job key pair encrypted with a public computer device key of a computer device key pair from a mobile user terminal, wherein the computer device key pair is associated with the computer device, transmitting, by the scan server arrangement, the received encrypted private scan job key to the computer device, and transmitting, by the scan server arrangement, the received encrypted scan job to the computer device for further processing of the scan job by the computer device.

By using two (asynchronous) key pairs and in particular a mobile user terminal (which is usually provided anyway) (of an authorised user), in contrast to the prior art, the scanning of scan jobs at a scanning device of the scanning system and in particular a secure transmission of the scan job can be carried out in a simple and at the same time secure manner. The use of card readers and signature cards can be omitted and thus the effort for such a security system.

The method serves to operate a scanning system, at least a scan server arrangement of a scanning system. A scanning system comprises at least one scan server arrangement and at least one scanning device that can be communicatively connected to the scan server arrangement.

Preferably, the scan server arrangement may be communicatively connectable to the scanning device via at least one communication network. The wireless and/or wired communication network may comprise at least one network, such as a Local Area Network (LAN), a Wireless LAN (WLAN), a Wide Area Network (WAN) and/or the like.

The at least one scanning device of the scanning system is preferably a network scanner. A network scanner may have a display, for example in the form of a display. A network scanner may comprise a processor, memory means, interfaces, etc. A scanning device according to the application comprises at least one scanning function, for example in the form of a scanning module. Further functions, such as a print function and/or a fax function, may be implemented.

A scan server arrangement may be formed by at least one computing device with server functionality and may in particular comprise a processor, storage means, interfaces, etc.

The scan server arrangement may be formed by a single scan server component. This scan server component may be implemented in the scanning device or the computer device or an additional (central) computing device.

Alternatively, the scan server arrangement may be formed by two distributed scan server components. In particular, a first scan server component may be configured to receive the scan job encrypted with a public scan job key of a scan job key pair from a scanning device communicatively connectable to the scan server arrangement. The first scan server component may be configured to transmit the received encrypted scan job to the computer device for further processing of the scan job by the computer device. The first scan server component may be implemented in the scanning device or the computer device or an additional computing device. In particular, the first scan server component may perform respectively control all steps (e.g., receiving, storing, sending and providing, respectively, etc.) related to the scan job. For example, the first scan server component may be an email server or the like.

A second scan server component (in particular remote from the first scan server component) may be configured to obtain a private scan job key of the scan job key pair encrypted with a public computer device key of a computer device key pair from a mobile user terminal. The second scan server component may be configured to transmit the received encrypted private scan job key to the computer device. The second scan server component may be implemented in the scanning device or the computer device or an additional computing device. In particular, the second scan server component may perform and control, respectively, all steps (e.g., obtaining, sending or providing, etc.) related to the encrypted private scan job key.

At least one computer device can be connected to the scanning system, in particular in the form of a (stationary) workstation and computer, respectively. In one embodiment, the scanning system can comprise the at least one computer device.

According to the method according to the application, the scan server arrangement, for example the first scan server component, receives an encrypted scan order and scan job, respectively. The scan job can be generated in particular by the at least one scanning device connectable to the communication network.

In order to encrypt the scan job and the scan data, respectively, it is proposed to use an asynchronous encryption (also called public key encryption method). In such a cryptographic method, a key pair is provided consisting of a secret part (private key) and a non-secret part (public key). In general, a public key allows anyone to encrypt data for the owner of the private key. The private key allows its owner to decrypt data encrypted with the public key.

According to the application, a scan job is encrypted with a public scan job key of an (asynchronous) scan job key pair. This encrypted scan job is received by the scan server arrangement from the scanning device. In particular, the scanning device has transmitted the encrypted scan job.

In order to enable a secure transmission and, in particular, further processing of the scan job by the computer device, it is proposed according to the application to transmit the encrypted scan job to the computer device, in particular to enable decryption of the scan job (locally) by the computer device. For this purpose, it is in particular necessary to also provide the private scan job key of the scan job key pair to the computer device.

In order to transmit the private scan job key to the computer device in a secure manner, it is proposed according to the application to (also) transmit it to the computer device in encrypted form. According to the application, it is proposed in particular to use an asynchronous encryption method for the encryption of the private scan job key of the scan job key pair.

According to the present application, it is provided that the scan server arrangement, for example the second scan server component, receives the private scan job key of the scan job key pair encrypted with a public computer device key of an (asynchronous) computer device key pair from a mobile user terminal (of the authorised user). According to the application, the computer device key pair is (uniquely) assigned to the computer device to be used, i.e. in particular to the computer device on which the scan job is further processed at least initially.

For example, when the encrypted scan job is sent through the scanning device by an email or similar messaging method, the user can access his or her email account (or similar account) in a conventional manner. The encrypted scan job may then be decryptable locally (only) by that particular computer device, as will be described in more detail.

It may also be provided that the encrypted scan job document is automatically downloaded from the email mailbox or account. For example, an application may be provided on a computer device that scans the email box or account for corresponding email attachments.

An assignment of the computer device key pair to the computer device to be used means in particular that the public computer device key is provided to a mobile user terminal at this computer device and the associated private computer device key is stored in the computer device (in a secure memory environment). Providing a public computer device key at the computer device means in particular that a mobile user terminal can only receive this public computer device key if it (and thus its user) is in immediate (physical) proximity (e.g. at least closer than 5 m, preferably at least closer than 1 m, and/or preferably in the room in which the computer device is located) to the computer device.

The private scan job key may be stored in a data memory of the mobile user terminal. This can be encrypted using the public computer device key. The encrypted private scan job key may be sent. In other words, the scan server arrangement may receive a private scan job key of the scan job key pair encrypted with a public computer device key of a computer device key pair from a mobile user terminal.

According to the application, the encrypted private scan job key and the encrypted scan job are transmitted so that the computer device is enabled to decrypt the scan job. In a variant of the application, the encrypted private scan job key is transmitted first. After decryption of the encrypted private scan job key locally by the computer device, the associated encrypted scan job may be requested. In response to this request, the associated encrypted scan job can be transmitted.

A scanning of a document or the like and transmitting the scan job to a computer device for further processing can be made possible in a particularly secure manner. According to the application, both scan-job-specific and computer-device-specific encryption takes place. This increases security compared to the prior art. In particular, the scan job is encrypted immediately after generation and only decrypted locally at the computer device at which the scan job is further processed.

As has already been described, the scan server arrangement can be at least partially integrated in the scanning device and/or computer device. In this case, communicatively connectable means in particular an internal (wireless or wired) communication link between the scan server arrangement, in particular scan server component, and the scanning device and/or the computer device.

In particular, it may be advantageous to integrate the scan server arrangement in a scanning device. Thus, it is advantageous that the encrypted scan job remains in the data memory of the scanning device. In the case of a plurality of scanning devices, each with an at least partially integrated scan server arrangement, it may be provided that the computer device polls each scanning device (and network copier, respectively) to obtain the scan job or to determine where the scan job is located. In the case of a very large number of scanning devices (e.g. >100, in particular >1000), an additional information server can be provided, which only stores the information where a scan job is located. This can then be requested by a computer device.

According to a further embodiment of the method according to the application the private computer device key of the computer device key pair may be stored in a data memory of the computer device. The method may comprise:
  decrypting, by the computer device, the obtained encrypted private scan job key with the stored private computer device key of the computer device key pair, and in particular
  decrypting, by the computer device, the received encrypted scan job with the decrypted private scan job key.

In other words, the computer device (in particular a decryption module of the computer device configured accordingly) first decrypts the private scan job key encrypted with the public computer device key of the computer device key pair using the private computer device key of this computer device pair. In particular, the private computer device key may be stored in a (secured) data memory of the computer device.

Subsequently (for example, after the associated encrypted scan job has been received in response to a corresponding request and/or the user has accessed his email account or the like on this computer device), the computer device (in particular a decryption module of the computer device configured accordingly) can decrypt the scan job encrypted with the public scan job key of the scan job key pair using the decrypted private scan job key from this scan job key pair.

Preferably, after decryption, according to a further embodiment of the method according to the application, further processing of the decrypted scan job can be performed by the computer device, such as displaying the document, modifying the document, etc. In particular, further processing can take place immediately after (successful) decryption of the scan job.

According to a preferred embodiment of the method according to the application, the method may comprise:
  providing (in particular generating), by the scanning device, the scan job key pair, in particular upon a creation of the scan job,
  encrypting the scan job with the public scan job key of the provided scan job key pair,
  causing, by the scanning device, transmitting of the encrypted scan job to the scan server arrangement (and/or the computer device), and
  providing, by the scanning device, the private scan job key of the provided scan job key pair at the scanning device, such that the mobile user terminal can obtain the private scan job key (only directly) at the scanning device).

A scan job key pair can be provided in particular during or after the (conventional) creation of a scan job by the scanning device. For example, a user can cause a document (e.g. text, image, etc.) to be scanned by actuating a user interface in a conventional manner. Then, the scanning device (in particular, an appropriately configured encryption module of the scanning device) can encrypt the scan job with the provided public scan job key. The encrypted scan job may be transmitted to the scan server arrangement by the scanning device. In other words, the scan server arrangement may receive the scan job from the scanning device in the manner described above.

In order to enable a transmitting of the private scan job key in a simple and secure manner, it can be provided to the mobile user terminal by the scanning device, in particular at the scanning device, so that the mobile user terminal can (only) receive the private scan job key at the scanning device. A providing of a private scan job key at the scanning device means in particular that a mobile user terminal can receive this private scan job key only if it is in immediate (physical) proximity (e.g. at least closer than 5 m, preferably at least closer than 1 m; preferably in the same room as the scanning device) to the scanning device.

In particular, the user who created the scan job at the scanning device may have the mobile user terminal. In other words, the mobile user terminal may be (uniquely) associated with the authorised user.

In principle, the transmitting of the private scan job key to the mobile user terminal can be done in any way, as long as it is ensured that the mobile user terminal must be at the scanning device to receive it. This can further increase the security.

According to a particularly preferred embodiment of the method according to the application, providing, by the scanning device, of the private scan job key of the provided scan job key pair may comprise displaying an optical scan job code by an optical display (and screen, respectively) of the scanning device. The optical scan job code may preferably contain at least the private scan job key. By displaying the private scan job key in an encoded manner, security can be enhanced in a simple manner. For example, the optical scan job code may be a barcode, such as a QR code, 2D barcode and/or the like.

The optical scan job code may be detected by an optical detection module of the mobile user terminal. In particular, the optical detection module may be a camera (with an image processing module). In order to capture the scan job code, it is in particular necessary that the mobile user terminal is in the immediate vicinity (e.g. less than 5 m, preferably less than 1 m) of the scanning device.

Preferably, the private scan job key can be extracted from the scan job code by the mobile user terminal. In particular, the private scan job key extracted from the optical scan job code can be stored in a (secure) data memory of the mobile user terminal. For example, the private scan job key may be stored in an encrypted form in the data memory of the mobile user terminal.

Alternatively or additionally, the private scan job key may be transmitted via a near field communication link that can be established between the mobile user terminal and the scanning device. Non-exhaustive examples include RFID connection, an NFC connection and a Bluetooth connection. In still other variants, a wired transmission may also be used.

According to a further embodiment of the method according to the application, the private scan job key of the provided scan job key pair may be deleted on (and in, respectively) (and in particular by) the scanning device after a receipt of the private scan job key by the mobile user terminal. By deleting the private scan job key when it is present on the mobile user terminal, security can be further enhanced. In particular, it can be avoided that the scan job key is in multiple locations at the same time. Upon a deletion on the scanning device, it can no longer be detected at the scanning device by unauthorised users.

According to one embodiment of the method according to the application, the deletion upon a receipt by the mobile user terminal may comprise a deletion of the private scan job key upon the expiry of a predetermined period of time after the start of the displaying of the optical scan job code. In particular, the scan job code may be displayed immediately after the scan job is created. In this embodiment, it is assumed in particular that the mobile user terminal has received the optical scan job code within the predetermined time period (e.g. between 5 s and 5 min, preferably between 10 s and 30 s), i.e. in particular has scanned it. If this has not been the case, it may be necessary to regenerate the key pair (and possibly the scan job).

Alternatively or additionally, the deletion of the private scan job key may occur upon a receipt of a confirmation message by the scanning device. The confirmation message may confirm the receipt of the private scan job key by the mobile user terminal. For example, the mobile user terminal may transmit a corresponding confirmation message after (successfully) storing the received private scan job key. Also, the transmission can be performed by a user action on the mobile user terminal. In this way, the user can actively confirm the successful detection and trigger the transmission of the confirmation message.

Preferably, a scanning application in the form of an installable computer program (in particular a so-called "app") can be provided on the mobile user terminal, which can be executed respectively is executed by a processor of the mobile user terminal. The scanning application can in particular control the method steps that can be carried out by the mobile user terminal, as will be described in more detail.

Furthermore, the optical scan job code may contain at least one further scan job datum, in particular selected from the group comprising:
  scan job identifier (unique identifier generated for the scan job),
  computer device identifier (for example, a unique code or (network) address),
  email address or similar of the user,
  user identifier (in particular of the user of the mobile user terminal),
  computer device identifier of the computer device (for example, a unique code) and/or a unique (network) address of the selected computer device,
  time date (for example, a scan job generation timestamp).

It shall be understood that two or more of the aforementioned scan job data may be contained. At least one of these scan job data (more than one may be combined) may be used as a scan identifier, as will be described in more detail.

In order to further increase security, according to a further embodiment of the method according to the application, the providing of the scan job key pair can comprise a generating of a new scan job key pair for each (newly) created scan job, i.e. in particular for each scanned document. In particular, the scanning device (in particular an appropriately configured key generator of the scanning device) can generate a new scan job key pair for each created scan job.

In other variants, a key pair can have a temporal validity (e.g. between 1 h and 72 h). Alternatively or additionally, it can be provided that a key pair is only valid for a certain number of scan jobs (e.g. between 2 and 20 scan jobs). When the validity expires, a new key pair can be generated.

In further variants, the key generator may be implemented in a further computing device of the scanning system and transmit a generated key pair to the scanning device (for example, via an encrypted communication link in response to a request by the scanning device).

As described above, according to a preferred embodiment of the method according to the application, the method may comprise:
  providing, by the computer device, the public computer device key of the provided computer device key pair such that the mobile user terminal can obtain the public computer device key (only) at the computer device, and
  storing the private computer device key of the provided computer device key pair in a (secure) data memory of the computer device.

According to a further embodiment of the method according to the application, providing, by the computer device, of the public computer device key of the provided computer device key pair may comprise displaying an optical computer device code. The optical computer device code may include the public computer device key.

The optical computer device code (preferably a barcode, such as a QR and/or 2D barcode) can be detected by an optical detection module of the mobile user terminal. In particular, the optical detection module may be a camera (with an image processing module). In particular, in order to detect the computer device code, it is necessary for the mobile user terminal to be in close proximity (less than 5 m, preferably less than 1 m) to the computer device.

Alternatively, a near field communication link can also be used here. Non-exhaustive examples are an RFID connection, an NFC connection and a Bluetooth connection. In still other variants, a wired transmission can also be used.

The optical computer device code may contain at least one other computer device datum, such as a computer device identifier.

According to a further embodiment of the method according to the application, the public computer device key may be a static and permanently, respectively, valid public computer device key. In particular, the optical computer device code may be a static or permanently valid public computer device key, for example in the form of a computer device code (e.g. a barcode) permanently attached to a (visible) outer wall and side, respectively, of the computer device. For example, this computer device code may be imprinted. In other variants of the application, the computer device code may also be displayed by the display or screen of a computer device.

As described above, the optical computer device code may be detected by an optical detection module of the mobile user terminal. The stored private scan job key may, according to a further preferred embodiment of the method according to the application, be encrypted by the mobile user terminal with the public computer device key (contained in the detected computer device code). In particular, this can be done immediately after the detection of the public computer device key.

The encrypted private scan job key may be transmitted, by the mobile user terminal, to the scan server arrangement (via the at least one communication network). Preferably, the transmitting can take place immediately after the encryption of the private scan job key. In particular, the transmitting may be a scan request message at the same time. In particular, performing the encryption and transmission immediately can ensure that the authorised user is still (actually) at the computer device when the scan request is further processed by it.

According to a further preferred embodiment of the method according to the application, obtaining, by the scan server arrangement, the encrypted scan job may comprise obtaining a first scan identifier. Obtaining, by the scan server arrangement, the encrypted private scan job key may comprise obtaining a further scan identifier. Transmitting the received encrypted scan job to the computer device and the received encrypted private scan job key to the computer device may be based on the first scan identifier and the further scan identifier. In particular, the scan identifier may be a datum that enables to assign the scan job with the associated private scan job key in an in particular unique manner. For example, the first and the further scan identifier can each be a (system-wide unique) scan job identifier and/or a (system-wide unique) user identifier and/or a (system-wide unique) time datum. It shall be understood that other identifiers can also be used as scan identifiers.

The scanning device may send the first scan identifier together with the encrypted scan job. Furthermore, the scanning device may provide the further scan identifier together with the private scan job key to the mobile user terminal. For example, the additional scan identifier may be integrated into the scan job code when the scan job code is generated. The additional scan identifier can also be transmitted via a near-field communication link.

As has already been described, the first scan identifier and the further scan identifier (which are in particular identical) can enable a mapping between the scan job and the associated encrypted private scan job key.

In a preferred variant of the application, the encrypted private scan job key with the (preferably also encrypted) further scan identifier can first be sent to the computer device. Then (upon a successful decryption) the (decrypted) further scan identifier may be sent in the form of a request message to the scan server arrangement by the computer device. In response, the associated encrypted scan job, determinable by the associated first scan identifier, may be sent to the requesting computer device by the scan server arrangement.

According to a further embodiment of the method according to the application, the method may comprise
storing, by the scan server arrangement, the received encrypted scan job together with the received first scan identifier in a data memory of the scan server arrangement.

Since the scanning device that creates the scan job is typically located remotely from the computer device, the initially received scan job data set containing at least the first scan identifier and the encrypted scan job may be stored in a (secure) data memory (for example, in an encrypted form). Upon receipt of a scan request message from the computer device, containing in particular the further scan identifier, or a scan request message from the mobile user terminal, containing in particular the further scan identifier and the encrypted private scan job key, the stored scan job can be determined and in particular forwarded to the computer device. In particular, the determination may be based on the association between the first identifier and the further identifier to a particular scan job.

Preferably, the method may further comprise:
comparing a received further scan identifier with the at least one stored first scan identifier, and
transmitting, if a correspondence (in particular identity) between the received further scan identifier and a stored first scan identifier is determined in the comparing step, the stored encrypted scan job with the first scan identifier corresponding to the received further scan identifier (and, if not already done, the received encrypted private scan job key with the further scan identifier) to the computer device.

If no correspondence is detected, no scan job is transmitted. According to variants of the application in this case, a (standard) message can be sent to the mobile user terminal that no scan job could be determined.

In particular, if an identity is determined between the received further scan identifier and an already stored first scan identifier, this can trigger the transmission of the corresponding data to the computer device. The comparing and, if necessary, transmitting can take place in particular immediately after receipt of the further identifier.

A further aspect of the application is a scan server arrangement for a scanning system. The scan server arrangement comprises at least one receiving module (in particular a communication interface for connecting to a communication network) configured to receive a scan job encrypted with a public scan job key of a scan job key pair from a scanning device. The at least one receiving module is configured to receive a private scan job key of the scan job key pair encrypted with a public computer device key of a computer device key pair from a mobile user terminal. The computer device key pair is (uniquely) associated with a computer device (used to process the scan job). The scan server arrangement comprises at least one transmitting module (in particular a communication interface for connecting to a communication network) configured to transmit the received encrypted scan job to the computer device for further processing of the scan job by the computer device. The at least one transmitting module is configured to transmit the received encrypted private scan job key to the computer device.

The scan server arrangement can be operated in particular with the method described above. The scan server arrangement may comprise, as described, a data memory for storing scan job data sets, each containing an encrypted scan job and in particular an associated first scan identifier.

Further, according to a further embodiment, the scan server arrangement may comprise a determination module configured to compare a received further scan identifier with the at least one stored scan identifier. When a correspondence is determined by the comparison, a transmitting of the corresponding data may occur, as described above.

As described above, the scan server arrangement according to the application may be formed by a single (central) scan server component or by two distributed scan server components, such as an email server and a scan server component configured to manage the encrypted private scan job key respectively the steps associated therewith.

A further subject matter of the application is a computer device for a scanning system. The computer device comprises at least one key pair providing unit configured to provide a computer device key pair comprising a private computer device key and a public computer device key. The computer device comprises at least one data memory for storing the private computer device key of the provided computer device key pair. The key pair providing unit is configured to provide the public computer device key of the provided computer device key pair such that the mobile user terminal can obtain the public computer device key at the computer device. The computer device comprises at least one receiving module (in particular a communication interface for connecting to a communication network) configured to receive a scan job encrypted with a public scan job key of a scan job key pair from a scan server arrangement, in particular a previously described scan server arrangement. The receiving module is configured to receive a private scan job key of a scan job key pair encrypted with the provided public computer device key from a mobile user terminal (via the scan server arrangement). The computer device comprises at least one decryption module configured to (locally) decrypt the received encrypted private scan job key with the stored private computer device key of the computer device key pair. The decryption module is configured to decrypt the received encrypted scan job with the decrypted private scan job key.

In particular, the computer device can be operated at least partially by the method described above. A corresponding method is in particular a stand-alone aspect of the application.

A further aspect of the application is a scanning device for a previously described scanning system. The scanning device comprises at least one scanning module configured to receive (or create) an unencrypted scan job. The scanning device comprises at least one providing module configured to provide a scan job key pair for the unencrypted scan job. The scanning device comprises at least one encryption module configured to encrypt the (unencrypted) scan job with the public scan job key of the provided print job key pair. The scanning device comprises at least one transmitting module (in particular a communication interface for connecting to a communication network) configured to transmit the encrypted scan job to the scan server arrangement. The providing module is configured to provide the private scan job key of the provided scan job key pair such that the mobile user terminal can obtain the private scan job key at the scanning device.

In particular, the scanning device can be operated at least partially with the method described above. A corresponding method is in particular a stand-alone aspect of the application.

A further aspect of the application is a scanning system. The scanning system comprises at least one scan server arrangement described above. The scanning system comprises at least one scanning device communicatively connectable with the scan server arrangement, in particular a previously described scanning device.

Preferably, the scanning system may comprise at least one mobile user terminal with a scanning application installed on the user terminal. Further, the scanning system may preferably comprise at least one previously described computer device.

It shall be understood that a scanning system may comprise two or more scan server arrangements and/or two or more scanning devices and/or two or more mobile user terminals and/or two or more computer devices.

A further aspect of the application is a scanning application in the form of a computer program installable on a mobile user terminal with computer code executable by a processor of the mobile user terminal. The scanning application comprises at least one receiving module configured to receive a private scan job key of a scan job key pair provided by a scanning device, wherein a scan job is encryptable by the scanning device with a public scan job key of the scan job key pair. The scanning application comprises at least one storing module configured to store the received private scan job key in a data memory of the mobile user terminal. The receiving module is configured to obtain a public computer device key of a computer device key pair provided by a computer device at the computer device. The scanning application comprises at least one encryption module configured to encrypt the stored private scan job key with the obtained public computer device key. The scanning application comprises at least one transmitting module configured to cause the encrypted private scan job key to be transmitted by a communication module of the mobile user terminal.

The mentioned modules of the scanning application are in particular software modules executable by a processor.

The scanning application in the form of a computer program, in particular the commands and program instructions, may be stored in a computer program product, in particular a program memory. For example, a programme memory is a non-volatile memory such as a flash memory, a magnetic memory, an EEPROM memory (electrically erasable programmable read-only memory) and/or an optical memory.

In addition, a mobile user terminal may have a main memory, for example a volatile or non-volatile memory, in particular a random access memory (RAM), such as a static RAM memory (SRAM), a dynamic RAM memory (DRAM), a ferroelectric RAM memory (Fe RAM) and/or a magnetic RAM memory (MRAM). For example, the processor of the user terminal may store intermediate results or the like in the main memory.

According to a preferred embodiment of the application scanning application, the transmitting module may be configured to cause a confirmation message to be sent upon receipt of the private scan job key, in particular after (successful) storing of the private scan job key in the data memory of the mobile user terminal.

A still further aspect of the application is a mobile user terminal with a previously described scanning application installed on the mobile user terminal.

Exemplary and non-exhaustive mobile user terminals are smartphones, tablet computers, mobile game consoles, laptops, netbooks, data glasses, smart watches and similar wearables.

A previously described module, element, etc. may comprise at least partially hardware elements (e.g. processor, memory means, etc.) and/or at least partially software elements (e.g. executable code). It is further understood that expressions such as "first", "second", etc., do not indicate an order, but merely serve to distinguish between two elements.

The features of the methods, scan server arrangements, scanning devices, scanning systems, computer devices, mobile user terminals and scanning applications can be freely combined with each other. In particular, features of the description and/or the dependent claims may be independently inventive, even by completely or partially circumventing features of the independent claims, alone or freely combined with each other.

BRIEF DESCRIPTION OF THE DRAWINGS

There are now a multitude of possibilities for designing and further developing the methods according to the application, the scan server arrangement according to the application, the scanning device according to the application, the computer device according to the application, the scanning application according to the application, the scanning system according to the application and the mobile user terminal according to the application. For this purpose, reference is made on the one hand to the patent claims subordinate to the independent patent claims, and on the other hand to the description of embodiments in connection with the drawing. The drawing shows:

Similar reference signs are used for at least similar elements.

DETAILED DESCRIPTION OF THE INVENTION

Figure 1:
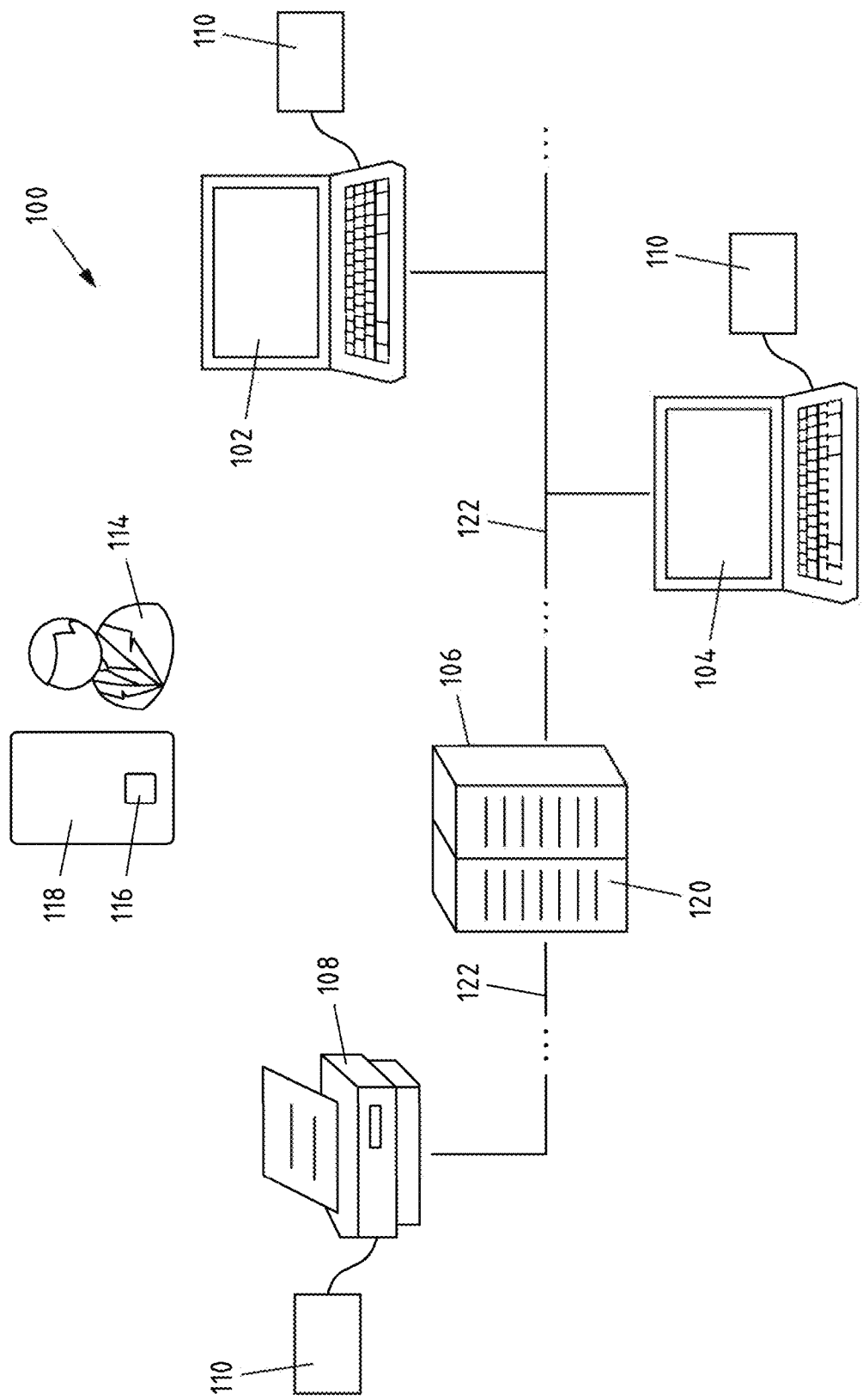
FIG. 1 is a schematic view of a scanning system according to the prior art.
Figure 2A:
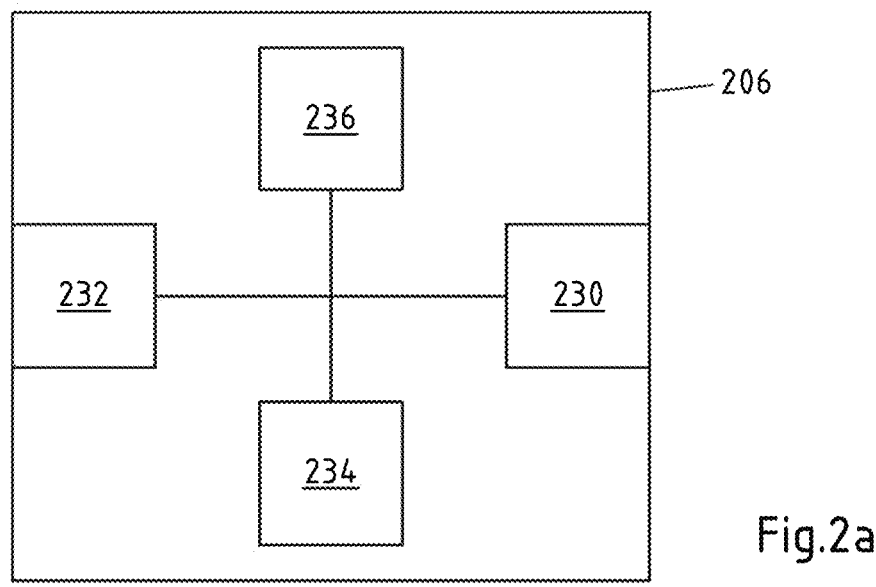
FIG. 2a is a schematic view of an embodiment of a scan server arrangement according to the present application.

FIG. 2a shows a schematic view of an embodiment of a scan server arrangement 206 according to the present application. The scan server arrangement 206 can be used in particular in a scanning system.

The scan server arrangement 206 shown in FIG. 2a is formed by a single scan server component. The scan server arrangement 206 and the scan server component, respectively, may in particular be formed by at least one computing device with at least one processor and memory means. In variants of the application, a scan server arrangement may be integrated in a scanning device or a computer device, in particular in a scanning device according to the present application or a computer device according to the present application.

The illustrated scan server arrangement 206 comprises a receiving module 230, a transmitting module 232, a data memory 234 and a determination module 236. The receiving module 230 and the transmitting module 232 may be formed by a bidirectional communication module. It shall be understood that other modules and/or further modules may be provided in other variants of the application.

The receiving module 230 may in particular comprise at least one communication interface for connecting to a communication network. The transmitting module 232 may in particular comprise at least one communication interface for connecting to a communication network (or an internal connection to a receiving module of a scanning device or computer device in which the scan server arrangement is integrated in this case).

It shall be understood that two or more communication interfaces can be provided in each case, in particular for a corresponding number of different networks (e.g. LAN, WLAN etc.).

The at least one receiving module 230 is configured at least to receive a scan job encrypted with a public scan job key of a scan job key pair from a scanning device. The received encrypted scan job may preferably be stored in the data memory 234 of the scan server arrangement 206 (temporarily, for example for a predetermined maximum time period (e.g. 1 h to 72 h)). After expiry of the time period, the job may be deleted. In particular, a scan job data set may be received and obtained, respectively, containing the encrypted scan job and preferably a unique first scan identifier. This data set may be stored in the searchable data memory.

Further, the at least one receiving module 230 may be configured to receive a private scan job key of the scan job key pair encrypted with a public computer device key of a computer device key pair from a mobile user terminal. The computer device key pair is (uniquely) associated with the computer device that will be used to process the scan job. In particular, the computer device that will be operated by the authorised user.

In particular, a key data set can be received and obtained, respectively, containing the encrypted private scan job key and preferably a unique further scan identifier corresponding to, in particular identical to, the first scan identifier.

In particular, immediately upon receipt of a key data set (or immediately upon receipt of a request message from the computer device, wherein the request message may include at least the further scan identifier), the determination module 236 may compare the further scan identifier with the at least one stored first scan identifier. If a correspondence, preferably identity, between the further scan identifier and the first scan identifier is determined by the determination module 236, the determination module 236 may cause the transmission of the corresponding data set (or, in the case of a request message, only the scan request data set) by the transmitting module 232.

Alternatively, the transmitting module 232 may immediately upon receiving a key data set forward it to the computer device. In this case, preferably the further scan identifier may also be encrypted by the public computer device key. After decryption, the computer device may (directly) transmit the request message and, correspondingly, the scan server arrangement may receive this request message. As has been described, the associated scan request data set can then be determined and sent.

The at least one transmitting module 232 is configured to transmit the received encrypted scan job to a computer device for further processing of the scan job by the computer device, as has been described. It should be noted that a scan job data set may include address data and/or a computer device identifier.

The at least one transmitting module 232 is further adapted to transmit the received encrypted private scan job key to the computer device, as has been described. It should be noted that a scan job data set may include address data and/or a scanning device identifier.

Figure 2B:
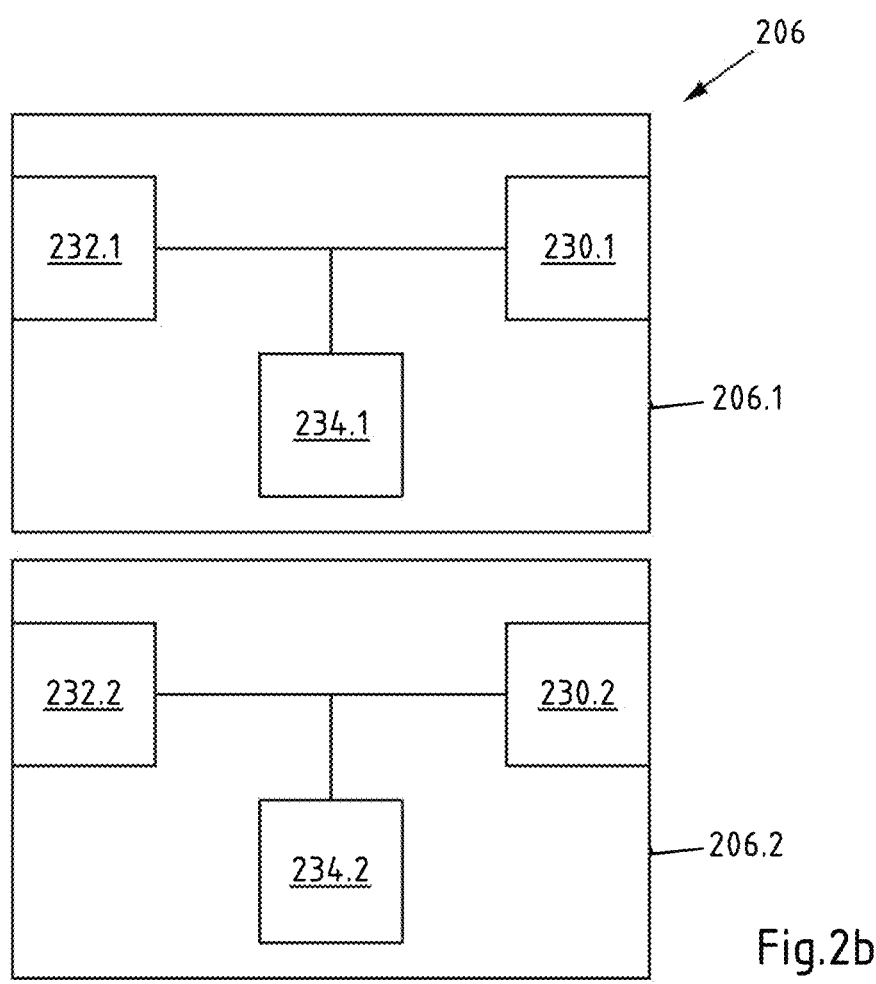
FIG. 2b is a schematic view of a further embodiment of a scan server arrangement according to the present application.

FIG. 2b shows a schematic view of a further embodiment of a scan server arrangement 206 according to the present application. In order to avoid repetitions, only the differences to the previous embodiment are described below and otherwise reference is made to the explanations of FIG. 2a.

Presently, the scan server arrangement 206 is formed by a first scan server component 206.1 and a second scan server component 206.2. The first scan server component 206.1 (e.g. an email server or the like) comprises a first receiving module 230.1 configured at least to receive a scan job encrypted with a public scan job key of a scan job key pair from a scanning device, as already described. The received encrypted scan job may preferably be stored in the data memory 234.1 of the first scan server component 206.1, as has already been described. Further, a first transmitting module 232.1 is provided configured to transmit the received encrypted scan job to a computer device for further processing of the scan job by the computer device, as has been described.

A determination module can be omitted in the present embodiment.

The second scan server component 206.2 comprises a second receiving module 230.2 configured to receive a private scan job key of the scan job key pair encrypted with a public computer device key of a computer device key pair from a mobile user terminal. Further, a second transmitting module 232.2 is provided configured to transmit the received encrypted private scan job key to the computer device as has been described. Optionally, a second data memory 234.2 may be provided.

In particular, the user can open his email account at the particular computer device so that he can receive the encrypted scan job from the first scan server component. Further, the user and the computer device, respectively, can obtain the encrypted private scan job key by the second scan server component, which may be implemented in particular on that computer device. Then, the private scan job key can be decrypted first and then the scan job.

Figure 3:
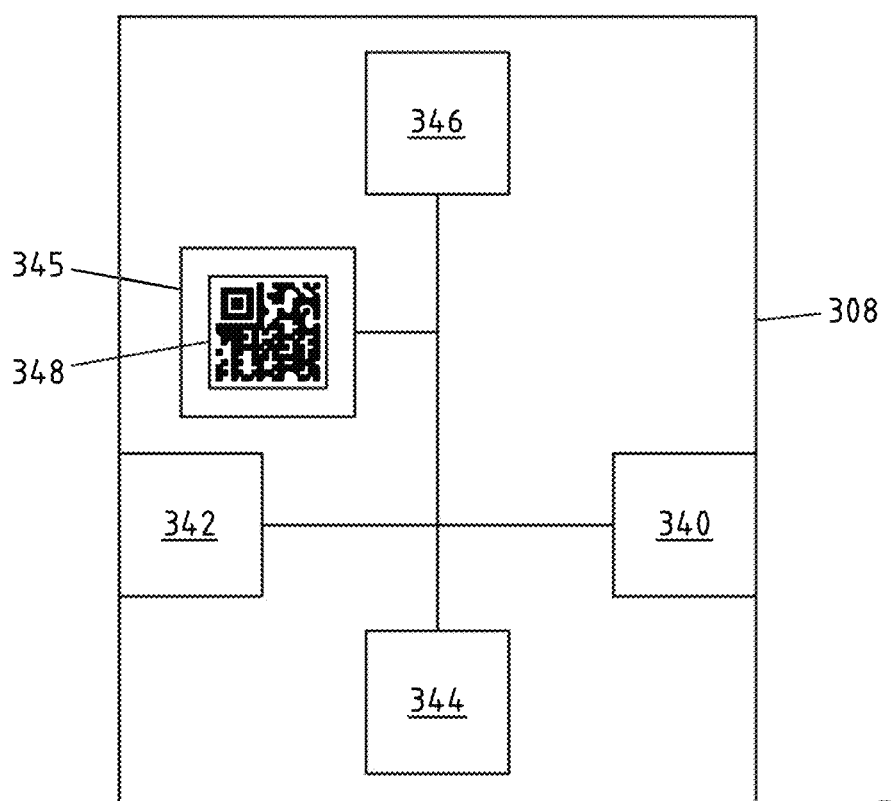
FIG. 3 is a schematic view of an embodiment of a scanning device according to the present application.

FIG. 3 shows a schematic view of an embodiment of a scanning device 308 according to the present application. The scanning device 308 can be used in particular in a scanning system.

In particular, the scanning device 308 may comprise at least one processor and memory means. In variants of the application, the scanning device may comprise a pre-described scan server arrangement at least in part.

The scanning device 308 is a network scanner 308 having at least one scanning functionality. It shall be understood that further functionalities (e.g. print functionality, fax functionality) may be implemented in a scanning device.

The shown scanning device 308 comprises a transmitting module 340, a providing module 344, a (secure) data store 342, an encryption module 346, a scanning module (not shown for ease of reference) and a display module 345.

The scanning module is conventionally configured to create a scan job. In particular, an image of a scannable medium (e.g. paper) can be created and data of the scanned document can be generated in the form of a scan job. A scan operation can be initiated by a user in a known manner.

The providing module 344 is configured to provide the scan job key pair. In particular, the scan job key pair can be provided upon (during) the creation of a scan job, i.e. in particular immediately after the scanning process and the generation of the corresponding scan data.

Preferably, the providing module 344 may be a key generation module 344 configured to generate the (asynchronous) scan job key pair. Preferably, the key generation module 344 may generate a new scan job key pair (may also be referred to as a session key pair) for each created scan job. As described above, in other variations of the application, a scan job key pair may also be usable or valid for a plurality of scan jobs. In particular, after a first scan job has been created, the scanning device 308 may query whether at least one further scan job is to be performed by that user. In particular, the same scan job key pair can then be used for all scan jobs of a user.

Furthermore, the scanning device 308 comprises an encryption module 346 configured to encrypt at least the at least one scan job with the public scan job key of the provided, in particular generated, scan job key pair. In other words, the scan data of the at least one scan job can be encrypted using the generated public scan job key. As described earlier, a plurality of scan jobs associated with a particular user can also be encrypted together or sequentially always using the same key.

Encrypting a scan job also comprises, in particular, encrypting the scan job with a synchronous key (which is also known to the scan server arrangement, for example) and subsequently encrypting only the synchronous key with the public scan job key. This may be particularly advantageous with regard to the required computing time and/or the amount of data to be transmitted. Optionally, a first scan identifier (which is uniquely assigned to the scan job) can also be encrypted.

A transmitting module 340 may in particular comprise at least one communication interface for connecting to a communication network (or an internal connection to a receiving module of a scan server arrangement, which in this case is integrated in the scanning device). It shall be understood that two or more communication interfaces may each be provided, in particular for a corresponding number of different networks (e.g. LAN, WLAN, etc.).

After an encrypting the at least scan job with the public scan job key, the transmitting module 340 may transmit the encrypted scan job to the scan server arrangement. In particular, a scan job data set containing at least the scan job and the described first scan identifier may be transmitted.

Furthermore, the private scan job key of the provided scan job key pair can be provided by the scanning device 308 in such a way that a mobile user terminal can obtain the private scan job key (only) at the scanning device 308. In particular, this means that a user terminal located remotely (e.g. outside the room in which the scanning device is located and/or in the room in which the scanning device is located at a distance greater than 5 m, preferably 1 m) from the scanning device 308 cannot detect the private scan job key.

In particular, providing the private scan job key of the provided scan job key pair in the present embodiment comprises displaying an optical scan job code 348 by the optical display 345 (for example, a display) of the scanning device 308. In particular, the optical scan job code 348 (preferably a barcode, such as a QR code) contains the private scan job key. As has been described, in other variants of the application, the provision may be via a near field communication link.

Preferably, the scan job code 348 can comprise further data, in particular at least the described further scan identifier (which is preferably identical to the first scan identifier and is also uniquely assigned to the scan job). Such a scan job code 348 can be detected or scanned by an optical detection device (in particular a camera) of the user's mobile user terminal.

Figure 4:
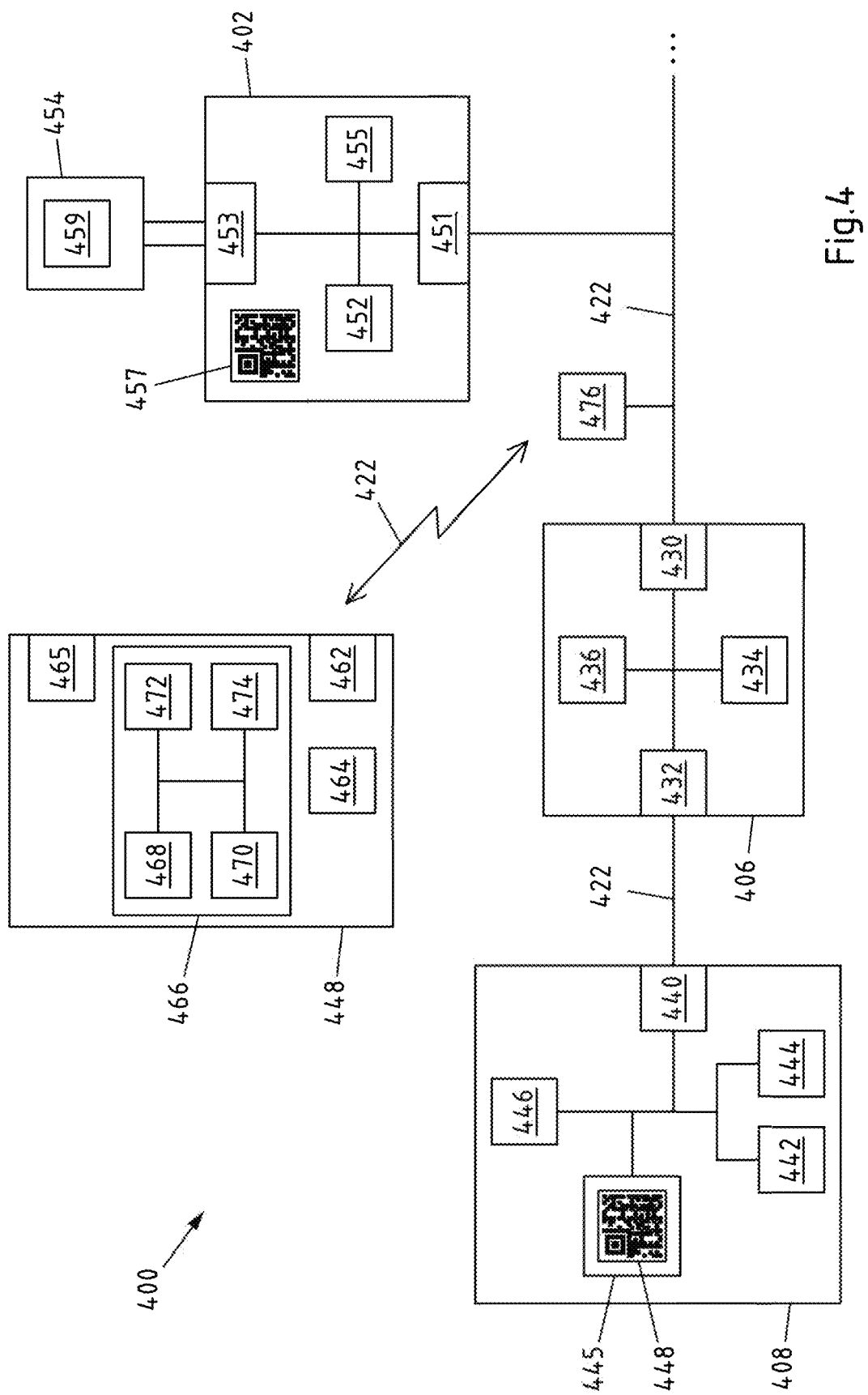
FIG. 4 is a schematic view of an embodiment of a scanning system according to the present application and an embodiment of a scanning application according to the present application and an embodiment of a computer device according to the present application.

FIG. 4 shows a schematic view of an embodiment of a scanning system 400 according to the present application and an embodiment of a scanning application 466 in the form of an executable computer program 466. Furthermore, FIG. 4 shows an embodiment of a computer device 402 of the present application. The scanning system 400, in particular a network scanning system 400, may in particular be implemented in at least one office building.

The scanning system 400 comprises a scanning device 408 and a scan server arrangement 406 communicatively connected to the scanning device 408. In the present case, the scan server arrangement is formed according to FIG. 2a, but may also be formed according to FIG. 2b. A (wireless and/or wired) communication network 422 is provided. As already described, in variants of the application the scan server arrangement may also be at least partially integrated in the scanning device and/or in the computer device.

The at least one scanning device 408 can in particular be formed in accordance with the scanning device according to FIG. 3, so that in order to avoid repetitions, reference is made below essentially to the explanations of FIG. 3.

As has already been described, the at least one scan server arrangement 406 can be formed in particular in accordance with the scan server arrangement according to FIG. 2a or b, so that in order to avoid repetitions, reference is made below essentially to the explanations of FIG. 2a or 2b.

As can further be seen, at least one mobile user terminal 458 (for example, a smartphone) and at least one (at least temporarily stationary) computer device 402 in the form of a workstation computer 402 are provided.

Preferably, a plurality of mobile user terminals 458 and/or a plurality of computer devices 402 may be provided. A plurality of computer devices 402 may use the scanning device 408 as a network resource. Preferably, the scanning system 400 may comprise the at least one mobile user terminal 458 and/or the at least one computer device 402.

The at least one computer device 402 may be communicatively connectable to the scan server arrangement 406 and the scanning device 408 via the communication network 422 via a receiving module 451, in particular in the form of a communication module 451. The scanning system 400 may comprise the communication network 422.

The computer device 402 may comprise a display 454 in the form of a display 454 or screen 454.

Further, the computer device 402 comprises a key pair providing unit 457, a (secure) data memory 452, a decryption module 455 and a further processing module 453 configured to further process a decrypted scan job, for example to cause the decrypted and scanned document 459 to be displayed by the optical display 454.

The at least one key pair providing unit 457 is configured to provide a computer device key pair comprising a private computer device key and a public computer device key. The at least one (secured) data store 452 is configured to store the private computer device key of the provided computer device key pair.

The key pair providing unit 457 is further configured to provide the public computer device key of the provided computer device key pair such that the mobile user terminal 458 can obtain the public computer device key (only) at the computer device 402. In the present embodiment, this is implemented by arranging an optical computer device code 457 (for example a barcode, in particular a QR and/or 2D barcode) on a visible outer side of the computer device 402.

For example, the computer device code 457 may be printed on the outer side of the computer device 402, or a sticker bearing the computer device code 457 may be affixed to an outer side. In variations of the application, the computer device code 457 may also be displayed by the display 454 of the computer device 402 (for example, following a manual request by a user).

Such a computer device code 457 may be sensed or detected by an optical sensing device 465 of a mobile user terminal 448. The computer device code 457 contains at least the public computer device key. Further data, such as a computer device identifier and/or address data of the computer device 402, may be contained.

The at least one receiving module 451 is configured to receive a scan job encrypted with a public scan job key of a scan job key pair from a scan server arrangement 406, for example a scan server arrangement 206 according to the embodiment according to FIG. 2a or 2b.

The at least one receiving module 451 is further configured to receive a private scan job key of a scan job key pair encrypted with the provided public computer device key from the mobile user terminal 458, preferably via the scan server arrangement 406. In particular, the encrypted scan job and the encrypted private scan job key may be received almost simultaneously. It is also conceivable that a common data set is received. Also, as has been described, only the encrypted key data set may be received initially and then, in response to a corresponding request message, the encrypted scan job may be received.

Optionally, the first and further scan identifiers may be provided to enable an association of scan job and private scan job key in a manner analogous to that described previously.

The at least one decryption module 455 is configured to decrypt the received encrypted private scan job key using the stored private computer device key of the pair of computer device keys. In particular, the decryption module 455 may access the data memory 452 and apply the private computer device key stored therein to the received encrypted private scan job key.

As has been described, after decryption, a request message may be sent by a transmitting module (for example, communication module 451) to request the associated scan job.

The decryption module 455 is further configured to decrypt the received encrypted scan job using the decrypted private scan job key. The then decrypted scan job and scan data, respectively, is then provided to the further processing module 453. As has been described, the encrypted scan job may also be obtained by an email message or similar message and access to the appropriate account. In either case, local decryption is performed by the computer device 402.

As shown schematically, a scanning application 466 is installed on the mobile user terminal 458, in particular in the form of an "app". The depicted scanning application 466 comprises a plurality of software modules 468, 470, 472 and 474 executable by a processor of the mobile user terminal 458. The modules 468, 470, 472 and 474 may interact, at least in part, with modules 465, 462 and 464 of the mobile user terminal 458.

The scanning application 466 comprises at least one receiving module 468 configured to receive the private scan job key of a scan job key pair provided by the scanning device 408. In this example, the receiving module 468 can receive the scan job code 448 detected by the camera 465 and extract, for example, the private scan job key contained in that code.

Further, the scanning application 466 may comprise at least one storing module 470 configured to store the received private scan job key in a (secure) data memory 464 of the mobile user terminal 458.

In addition, the receiving module 468 is in particular configured to obtain a public computer device key of a computer device key pair provided by the computer device 402 to the computer device 402. In this example, the receiving module 468 may receive the computer device code 457 detected by the camera 465 and extract, for example, the private computer device key contained in this code 457.

The scanning application 466 comprises at least one encryption module 472 configured to encrypt the stored private scan job key with the received public computer device key. In particular, upon receipt of the public computer device key, the stored private computer device key may be encrypted, in particular immediately.

Further, the scanning application 466 comprises at least one transmitting module 474 configured to cause transmitting the encrypted private scan job key by a communication module 462 of the mobile user terminal 458. In particular, the mobile user terminal 458 may be connectable and connected, respectively, to the communication network 422 via the communication module 462 (for example, comprising a WLAN interface or the like). As can be seen, a wireless channel with a communication unit 476 (for example, a WLAN node coupled to the wired network) may be used for communication.

The transmitting module 474 is further in particular configured to cause a transmitting of a confirmation message by the communication module 462 of the mobile user terminal 458 upon receipt of the private scan job key. For example, upon a detection of a successful storing of the private scan job key, the transmission may be immediately effected.

The private scan job key of the provided scan job key pair may be deleted on the scanning device 408 after a receipt by the mobile user terminal 458, in particular immediately after receipt of the confirmation message. As described above, the optional deletion may also be time-dependent in variants of the application.

Figure 5:
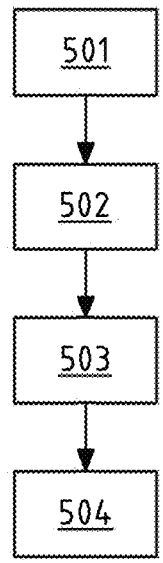
FIG. 5 is a diagram of an embodiment of a method according to the present application.

FIG. 5 shows a diagram of an embodiment of a method according to the present application for operating a scanning system (cf. e.g. FIG. 4), at least for operating a scan server arrangement (cf. e.g. FIGS. 2a, 2b, 4).

In a first step 501, obtaining, by the scan server arrangement, of at least one scan job encrypted with a public scan job key of a scan job key pair occurs from a scanning device connectable to the communication network (as previously described).

In a step 502 (in particular downstream in time), an obtaining of at least one private scan job key of the scan job key pair encrypted with a public computer device key of a computer device key pair occurs by the scan server arrangement from a mobile user terminal (as previously described). The computer device key pair is associated (system-wide uniquely) with the computer device.

In step 503, a transmitting, by the scan server arrangement, of at least the received encrypted scan job occurs to the computer device for further processing of the scan job by the scanning device (as previously described).

In step 504, a transmitting, by the scan server arrangement, of at least the obtained encrypted private scan job key occurs to the computer device (as previously described).

In particular, steps 503 and 504 can be performed at least partially in parallel and/or said data can be transmitted in one data set (in one or more data packets). However, as has been described, a time offset can also be provided, in particular if the scan job is not sent until a request message is received.

Figure 6:
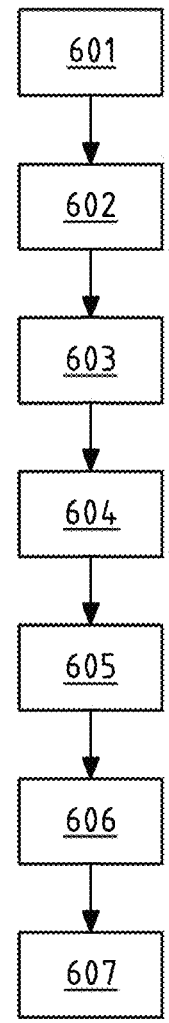
FIG. 6 is a diagram of a further embodiment of a method according to the present application.

FIG. 6 shows a diagram of a further embodiment for operating a scanning system (cf. e.g. FIG. 4), at least for operating a computer device (cf. e.g. FIGS. 3, 4).

In a first step 601, providing, by a computer device, of a computer device key pair comprising a private computer device key and a public computer device key occurs (as previously described).

In step 602, a storing, by the computer device, of the private computer device key of the provided computer device key pair occurs in a data memory of the computer device and, in particular, a providing of the public computer device key of the provided computer device key pair at the computer device, such that the mobile user terminal can obtain the public computer device key (only) at the computer device (as previously described).

Further, in step 603, an obtaining, by the computer device, of a private scan job key of a scan job key pair encrypted with the provided public computer device key occurs from a mobile user terminal via the scan server arrangement (as has already been described).

In the next step 604, an obtaining, by the computer device, of a scan job encrypted with a public scan job key of a scan job key pair may occur from a scan server arrangement (as has already been described).

Then, in step 605, a decrypting, by the computer device, of the received encrypted private scan job key with the stored private computer device key of the pair of computer device keys occurs (as previously described). Subsequently, in step 606, a decrypting, by the computer device, of the received encrypted scan job with the decrypted private scan job key occurs (as described earlier).

Optionally, a request message can be sent first after step 605. In response to this, the scan job can then first be received according to step 604. Then step 606 can follow.

In a further step 607, further processing of the decrypted scan job and the corresponding scan data, respectively, can occur (as has already been described).

Figure 7:
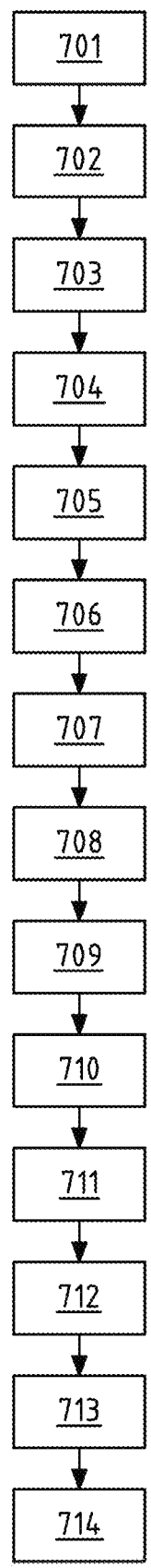
FIG. 7 is a diagram of a further embodiment of a method according to the present application.

Preferably, the methods according to FIGS. 5 and 6 can be combined with each other. This is explained below by way of example with the help of a particularly preferred embodiment in FIG. 7. FIG. 7 shows a diagram of a further example of a method for operating a scanning system (cf. e.g. FIG. 4).

In a first step 701, a scan job may be created by the scanning device 408 operated by an authorised user having a mobile user terminal 458. If the creation of a scan job is detected (i.e. in particular scanned data based on a corresponding user input), in step 702 an (asynchronous) scan job key pair may be generated for this scan job, which is valid only for this scan job. As described, the same scan job key pair can also be used for several scan jobs (generated in immediate succession) of the same user.

In step 703, this scan job can then be encrypted with the public scan job key of the generated scan job key pair. In particular, in parallel, the private scan job key may be displayed in step 704 in the form of an optical scan job code by an optical display 445 of the scanning device 408.

In step 705, the encrypted scan job may be sent by the scanning device 408. In particular, a scan job data set may be sent containing the encrypted scan job, a first scan identifier (for example formed by a user identifier and a timestamp e.g. of the scan job creation) and a computer device identifier and/or computer device address of the computer device to be used for further processing of the scan job and selected, respectively, by the user from in particular a plurality of available computer devices. This step comprises in particular obtaining the encrypted scan job, preferably the described scan job data set, by the scan server arrangement 406.

The aforementioned steps are in particular independently inventive and serve in particular to operate a scanning device.

In step 706 (which may be performed at least partially in parallel with step 705), a detecting of the displayed scan job code may be performed. The scan job code can preferably contain said private scan job key and in particular a further scan identifier (for example formed by a user identifier and a timestamp e.g. of the scan job creation) and preferably a computer device identifier and/or computer device address which is to be used for further processing of the scan job and has been selected, respectively, by the user from in particular a plurality of available computer devices. Preferably, the first scan identifier and the further scan identifier can be identical and, in particular, uniquely assigned to the scan job.

The data extracted in particular from the scan job code (private scan job key, scan identifier and computer device identifier and/or computer device address) may be stored in a data memory of the mobile user terminal 458 (step 707).

Said private scan job key may be deleted after a specific period of time has elapsed (e.g. after 30 s after the start of the visual displaying of the scan job code) and/or after receipt of a confirmation message (sent by the mobile user terminal 458) on the scanning device 408.

The user, together with his or her mobile user terminal 458, may move from the scanning device 408 to the computer device 402 (typically) located remotely from the scanning device 408 after scanning the scan job code. For example, the scanning device 408 may be located in a different room than the computer device 402 or at least significantly distant (greater than 5 m, in particular greater than 10 m) from the computer device 402.

At the computer device 402, in step 708, the computer device code 448 can be detected by this mobile user terminal 458 (in particular by the authorised user), in particular scanned by means of the camera. The computer device code includes at least the public computer device key of an (asynchronous) computer device key pair uniquely associated with the computer device 402, and optionally the computer device identifier and/or the computer device address of the computer device 402.

It should be noted that the computer device key pair of a computer device 402 may be updated periodically, in particular a new computer device key pair may be generated.

In step 708, an encrypting of the stored private scan job key with the received public computer device key may occur by the scanning application 466 and the mobile user terminal 458, respectively.

Prior to this step, an optional comparing may occur whether the computer device identifier and/or computer device address detected at the computer device 402 matches the computer device identifier and/or computer device address stored with the private scan job key. If this is not the case, a respective indication may be provided to the user via an interface of the mobile terminal 458. If a match is detected in the optional comparing step, the stored private scan job key may be encrypted with the received public computer device key in step 708.

In other variants, an email address of the user may also be used as an alternative to the computer device identifier and/or the computer device address, as has already been described.

In step 709, the encrypted private scan job key may be transmitted. Preferably, a key data set may be transmitted containing the encrypted scan job key, the further scan identifier, and in particular the computer device identifier and/or the computer device address (or an email address). In particular, step 709 comprises obtaining, by the scan server arrangement 406, the encrypted private scan job key, in particular said key data set. In variants of the application, the scan job key and scan identifier may be encrypted together, as has been explained.

In particular, after obtaining said data, it may be determined immediately thereafter in step 710 whether an associated scan job is stored in the data memory 434 of the scan server arrangement 406. In particular, the received further scan identifier may be compared to all stored first scan identifiers of the stored scan jobs. As has been described, the key data set may also be forwarded (directly) to the computer device 402 and the determination may only occur upon receipt of a pre-described request message.

If a correspondence, in the present embodiment an identity, is detected between the received further scan identifier and a stored first scan identifier, the encrypted scan job, preferably scan job data set, stored for this first scan identifier and the received encrypted private scan job key, in particular the corresponding key data set, can be transmitted (together) (step 711).

In particular, in the present example, a transmitting occurs to the computer device 402 depending on the computer device identifier and/or the computer device address (and/or an email address). The step 711 comprises at least obtaining, by the computer device 402, the obtained encrypted scan job and the encrypted private scan job key.

In step 712, a decrypting, by the computer device 402, of the private scan job key occurs using the private computer device key of the computer device 402.

Subsequently, in step 713, this decrypted private scan job key is used by the computer device 402 to decrypt the associated scan job. The scan job can be accessed, for example, via an email account Then, in step 714, the decrypted scan job can be further processed. The authorised user located at the computer device 402 can, for example, receive the displayed document. Secure scanning and transmitting of the scan job can be ensured.

The following is a brief description of the application: As has already been described, in this day and age it can be assumed that smartphones or similar mobile user terminals are widely available. According to the application, it has been recognised that it therefore makes sense to make the infrastructure required for a "signature card approach" superfluous by using mobile user terminals.

The aim of the application is further to achieve a user-related encryption of scan outputs. Instead of using an actual personal key, however, the approach according to the application is based in particular on a so-called session key pair, i.e. it is an (asynchronous) key pair that can preferably be used exclusively for this one scanning process. Thus, the key pair is (inherently) person-related (it is only used by the scanning and authorised person at that moment, i.e. it is uniquely assigned to this person), and furthermore also device-related (because it is only valid for the process for the device used for further processing (i.e. the selected computer device)) and also scan job-related, because a new key can be generated for each scan job. This significantly increases security compared to the state of the art.

The preferred scanning sequence or method according to the application can be divided into four phases, with the individual phases being independently inventive:

1. Job session key pair generating (or scan job key pair generation, in particular by the scanning device) and transmitting of the job session private key (or scan job private key) to a mobile user terminal by the user who created or is authorised to create the scan job.
2. Encryption of the job (or scan order) with the job session public key and transmitting of the encrypted scan order to the scan server arrangement.
3. Transmitting the job session private key from the mobile user terminal to the computer using a computer session pair (computer device key pair) consisting of computer session private key and computer session public key.
4. Transmitting the scan job encrypted with the job session public key from the scan server arrangement to the terminal or computer device and decrypting the encrypted scan job with the job session private key on the computer device.

Phase 1: Key Transmission

As soon as a document is scanned, the scanner or scanning device can generate a new key pair for the scanning process or job, in particular consisting of job session private key and job session public key (as has been described).

The job session private key can be encoded as a 2D barcode and displayed as an image on the scanning device screen. A scanning application on the mobile user terminal can copy the key data to a secure memory on the user terminal using the camera.

Phase 2: Encryption of the Scan Job and Transmission to the Scan Server Arrangement As soon as the key is copied (there can be a pre-described confirmation, for example by the user), the scan job can be encrypted with the job session public key and transmitted to the scan server arrangement. There it can be stored as it is, i.e. encrypted with the job session public key.

Phase 3: Transmitting the Job Session Private Key

The user moves from the scanning device to the workstation or computer device and can photograph the device session public key with the scanning application. With this key, the job session private key can now be encrypted and sent via the scan server arrangement to the workstation. There it can be decrypted again using the device session private key so that it is now available for decrypting scan jobs.

Phase 4: Transmitting the Job and Decryption

Now that the private key for decrypting the job is on the workstation, the scan job can be sent to the machine and decrypted again there using that very key. In particular, a pre-written request message and a corresponding response can be sent for this purpose.

As already described, the scan server arrangement can technically also run on the copier or scanning device. This has the particular advantage that the scan remains on the copier until it is collected. No central storage space is needed. The resulting problem of how the computer device or the workstation knows which copier to request (with a central server this is easy, there is only one) can be solved, for example, with a round-robin poll (in particular, if there are not so many copiers) or with an information server component that manages this information (where is which job). This is then also a server, but it does not have to maintain security-relevant information or store large amounts of data.

If the scan job is transmitted via mail server, then the scan server or the second scan server component is only necessary for the key transport. In summary, this means that a single scan server component can be used for both roles (key provision from mobile phone) and document storage/transport or a first scan server component can be used only for the document storage/transport role (i.e. in particular an e-mail server) and a second scan server component can be used only for one role (key provision).

If the scan job comes in by email, the application can query the mailbox on the workstation itself and search for suitable attachments.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of operating a scanning system comprising at least one scan server arrangement and at least one scanning device communicatively connected to the scan server arrangement, comprising:
   obtaining, by the scan server arrangement, an encrypted scan job, the encrypted scan job being a scan job encrypted with a public scan job key of a scan job key pair from a scanning device communicatively connected via a wired or wireless communication network to the scan server arrangement,
   obtaining, by the scan server arrangement via the wired or wireless communication network, an encrypted private scan job key of the scan job key pair, the encrypted private scan job key being a private scan job key encrypted with a public computer device key of a computer device key pair from a mobile user terminal,
   wherein the computer device key pair is associated with a computer device,
   transmitting, by the scan server arrangement via the wired or wireless communication network, the encrypted private scan job key to the computer device, and
   transmitting, by the scan server arrangement via the wired or wireless communication network, the encrypted scan job to the computer device;
   obtaining the scan job by the computer device, by decrypting the encrypted scan job using at least the encrypted private scan job key.

2. The method of claim 1, wherein
a private computer device key of the computer device key pair is stored in a data memory of the computer device, the method further comprising:
   decrypting, by the computer device, the encrypted private scan job key with the stored private computer device key of the computer device key pair to obtain a decrypted private scan job key, and
   decrypting, by the computer device, the encrypted scan job with the decrypted private scan job key.

3. The method of claim 2, wherein the method comprises:
   providing, by the scanning device, the scan job key pair, in particular upon a creation of the scan job,
   encrypting the scan job with the public scan job key of the scan job key pair,
   transmitting, by the scanning device, the encrypted scan job to the scan server arrangement, and
   providing, by the scanning device, the private scan job key of the scan job key pair such that the mobile user terminal can obtain the private scan job key at the scanning device.

4. The method of claim 3, wherein
providing, by the scanning device, the private scan job key of the scan job key pair comprises displaying an optical scan job code by an optical display of the scanning device,
   wherein the optical scan job code contains the private scan job key.

5. The method of claim 4, wherein
the private scan job key of the scan job key pair on the scanning device is deleted after a receipt by the mobile user terminal.

6. The method of claim 1, wherein
providing the scan job key pair comprises generating a new scan job key pair for each created scan job.

7. The method of claim 1, wherein the method comprises:
   providing, by the computer device, the public computer device key of the computer device key pair such that the mobile user terminal can obtain the public computer device key at the computer device, and
   storing a private computer device key of the computer device key pair in a data memory of the computer device.

8. The method of claim 7, wherein
providing, by the computer device, the public computer device key of the computer device key pair comprises displaying an optical computer device code,
   wherein the optical computer device code contains the public computer device key.

9. The method of claim 1, wherein
obtaining, by the scan server arrangement, the encrypted scan job comprises obtaining a first scan identifier, and
   the method further comprises obtaining, by the scan server arrangement, a further scan identifier,
   wherein at least transmitting the encrypted scan job to the computer device is based on the first scan identifier and the further scan identifier.

10. The method of claim 9, wherein the method comprises:
    storing, by the scan server arrangement, the encrypted scan job together with the first scan identifier in a data memory of the scan server arrangement,
    wherein the method further comprises in particular:
    comparing the further scan identifier with the first scan identifier, and
    transmitting, when a correspondence between the further scan identifier and the first scan identifier is determined in the comparing step, the encrypted scan job with the first scan identifier corresponding to the further scan identifier to the computer device.

11. A scan server arrangement for a scanning system, the scanning server comprising a processor and a memory, the memory storing program instructions that, when executed by the processor, cause the scanning server to:
    receive an encrypted scan job, the encrypted scan job being a scan job encrypted with a public scan job key of a scan job key pair from a scanning device communicatively connected via a wired or wireless communication network to the scan server arrangement,
    obtain via the wired or wireless communication network an encrypted private scan job key of the scan job key pair, the encrypted private scan job key being a private scan job key encrypted with a public computer device key of a computer device key pair from a mobile user terminal,
    wherein the computer device key pair is associated with a computer device, transmit via the wired or wireless communication network the encrypted private scan job key to the computer device, and transmit via the wired or wireless communication network the encrypted scan job to the computer device so that the computer device is able to obtain the scan job by decrypting the encrypted scan job using at least the encrypted private scan job key.

12. A computer device for a scanning system comprising:

at least one data memory, wherein the computer device is configured to:

provide a computer device key pair comprising a private computer device key and a public computer device key, the private computer device key being stored in the at least one data memory, provide the public computer device key of the computer device key pair such that a mobile user terminal can obtain the public computer device key at the computer device, receive a scan job encrypted with a public scan job key of a scan job key pair from a scan server arrangement communicatively connected to the computer device via a wired or wireless communication network, obtain via the wired or wireless communication network an encrypted private scan job key of a scan job key pair, the encrypted private scan job key being a private scan job key encrypted with the public computer device key from the mobile user terminal via the scan server arrangement, decrypt the encrypted private scan job key with the private computer device key of the computer device key pair stored in the at least one data memory to obtain a decrypted private scan job key, and decrypt the received encrypted scan job with the decrypted private scan job key to obtain the scan job.

13. A scanning system, comprising:

at least one scan server arrangement, and at least one scanning device communicatively connected to the scan server arrangement;

wherein the scan server arrangement comprises a processor and a memory, the memory storing program instructions that, when executed by the processor, cause the scan server arrangement to:

receive an encrypted scan job, the encrypted scan job being a scan job encrypted with a public scan job key of a scan job key pair from the at least one scanning device communicatively connected via a wired or wireless communication network to the scan server arrangement, obtain via the wired or wireless communication network an encrypted private scan job key of the scan job key pair, the encrypted private scan job key being a private scan job key encrypted with a public computer device key of a computer device key pair obtained from a mobile user terminal, wherein the computer device key pair is associated with a computer device, transmit via the wired or wireless communication network the encrypted private scan job key to the computer device, and transmit via the wired or wireless communication network the encrypted scan job to the computer device so that the computer device is able to obtain the scan job by decrypting the encrypted scan job using at least the encrypted private scan job key.

14. A non-transitory, machine-readable storage medium having stored thereon a scanning application in the form of a computer program installed on a mobile user terminal with computer code executable by a processor of the mobile user terminal, the scanning application configured to cause the mobile user terminal to:

receive optically or through a wired or wireless communication network a private scan job key of a scan job key pair provided by a scanning device, wherein a scan job is encrypted with a public scan job key of the scan job key pair by the scanning device, store the private scan job key in a data memory of the mobile user terminal, obtain optically or through the wired or wireless communication network a public computer device key of a computer device key pair provided by a computer device at the computer device, encrypt the private scan job key stored in the data memory of the mobile user terminal with the public computer device key obtained from the computer device to provide an encrypted private scan job key, and cause transmission of the encrypted private scan job key via the wired or wireless communication network to the computer device so that the computer device is able to obtain the scan job by decrypting the encrypted scan job using at least the encrypted private scan job key.

15. The scanning system of claim 13, wherein the at least one scanning device is configured to:

receive an unencrypted scan job, provide a scan job key pair for the unencrypted scan job, encrypt the unencrypted scan job with a public scan job key of the provided scan job key pair to provide an encrypted scan job, transmit the encrypted scan job to a scan server arrangement communicatively connected to the scanning system via a wired or wireless communication network, and provide via the wired or wireless communication network private scan job key of the provided scan job key pair such that the mobile user terminal can obtain the private scan job key at the scanning device.

* * * * *